United States Patent
Patzelt et al.

(10) Patent No.: US 7,033,417 B1
(45) Date of Patent: Apr. 25, 2006

(54) METHOD AND INSTALLATION FOR REDUCING OREFINES IN A MULTI-STAGE SUSPENSION GAS STREAM USING A CYCLONE SEPARATOR

(75) Inventors: Norbert Patzelt, Beckum (DE); Jürgen Klonus, Diestedde (DE); Dietrich Menzel, Beckum (DE)

(73) Assignee: Polysius AG, Beckum (DE)

( * ) Notice: Subject to any disclaimer, the term of this patent is extended or adjusted under 35 U.S.C. 154(b) by 243 days.

(21) Appl. No.: 10/168,151

(22) PCT Filed: Sep. 26, 2000

(86) PCT No.: PCT/EP00/09418

§ 371 (c)(1),
(2), (4) Date: May 28, 2003

(87) PCT Pub. No.: WO01/44522

PCT Pub. Date: Jun. 21, 2001

(30) Foreign Application Priority Data

Dec. 15, 1999 (DE) ................................ 199 60 575

(51) Int. Cl.
*C21B 11/00* (2006.01)

(52) U.S. Cl. .............................. 75/450; 75/447; 75/444

(58) Field of Classification Search .................. 75/447, 75/450, 439, 444
See application file for complete search history.

(56) References Cited

U.S. PATENT DOCUMENTS

| 4,207,093 | A | | 6/1980 | Pastorino et al. |
| 4,255,185 | A | * | 3/1981 | Schulte et al. ................. 75/474 |
| 4,901,448 | A | * | 2/1990 | Rother et al. ................... 34/85 |
| 5,560,762 | A | * | 10/1996 | Bresser et al. ................ 75/447 |
| 6,277,324 | B1 | * | 8/2001 | Joo et al. ..................... 266/142 |

FOREIGN PATENT DOCUMENTS

DE          1 160 462          1/1964

* cited by examiner

*Primary Examiner*—Scott Kastler
(74) *Attorney, Agent, or Firm*—Muramatsu & Associates

(57) ABSTRACT

The invention relates to the reduction of fine ores, whereby in a multi-stage gas suspension preheater the fine ores are preheated, calcined and then reduced in at least one lowest heat exchanger stage with the addition of a reducing agent in a delivered hot gas stream. The principal part of the reducing heat treatment of the fine ores is carried out in a reactor loop constructed in the lowest heat exchanger stage of the gas suspension preheater. The reactor loop has an uptake conduit section and a curved section adjoining the uptake conduit section and with which the reactor loop opens into at least one precipitating cyclone which is disposed downstream and for this purpose a hot reducing gas is introduced into the rising hot gas stream.

20 Claims, 2 Drawing Sheets

METHOD AND INSTALLATION FOR REDUCING OREFINES IN A MULTI-STAGE SUSPENSION GAS STREAM USING A CYCLONE SEPARATOR

The invention relates to a method and to apparatus for the reduction of fine ores.

It is generally known that fine ores, e.g. iron, nickel, chromium and manganese ores, can be dried, preheated, calcined and partially reduced or pre-reduced using a gas suspension preheater or reactor. For more thorough reduction of these pre-reduced fine ores a rotary kiln or an electric kiln can be connected downstream, and the pre-reduced fine ores can be delivered to it—depending upon the equipment of the electric kiln—in the hot-briquetted state or directly.

An example for the reduction of fine ores is described for instance in DE-A-28 52 964. According to this publication, the ores which are preheated, calcined and pre-reduced in a gas suspension preheater are first of all hot-briquetted and then finally reduced in an electric kiln from which hot exhaust gases are led via a kiln exhaust gas conduit to two cyclones which form the lowest cyclone stage of the gas suspension preheater. An additional combustion chamber and—between this additional combustion chamber and the lowest cyclone stage—a feed conduit for fine coal is connected to this kiln exhaust gas conduit. With the aid of the additional combustion chamber, the exhaust gases coming from the electric kiln can be further heated if required, whilst the fine coal introduced thereafter—when viewed in the gas flow direction—serves as solid reducing agent for the preheated and calcined fine ores.

Although this known construction should create an economical and uniform reduction not only of fine ores but also of lump ores, it has been shown in practice that this object could not be fulfilled at least to the extent which is desired and necessary.

SUMMARY OF THE INVENTION

The object of this invention, therefore, is to make further improvements to a method apparatus in such a way that the earlier requirements of the aforementioned known construction are met and thus in an extremely reliable and reproducible manner an economical and uniform reduction in particular of fine ores is made possible, and moreover good facilities for regulating and influencing the gas suspension preheater should also be ensured.

In this method according to the invention, the fine ores to be reduced can first of all be preheated and calcined in the necessary manner in a heat exchanger stage or in a plurality of heat exchanger stages of the gas suspension preheater or reactor which are disposed one above the other. According to a significant idea of the present invention, the principal part, that is to say the principal work of the reducing heat treatment of the preheated and calcined fine ores is carried out in a reactor loop specially constructed in the lowest heat exchanger stage of the gas suspension preheater (or reactor) with cyclone precipitation downstream, and for this purpose a hot gaseous reducing agent is introduced into the rising hot gas stream, so that the necessary reducing atmosphere can be created and maintained in this reactor loop, and at least partially into the appertaining cyclone separation. In the tests on which the invention is based, it was possible to confirm that by means of the simple measures, i.e. in particular by the use of a hot gaseous reducing agent and a correspondingly constructed special reactor loop, an extremely reliable and reproducible and especially thorough reduction of the preheated and calcined fine ores could be achieved, and this reduction of the fine ores according to the invention can be carried out particularly economically and very uniformly in the lowest heat exchanger stage. Thus since the fine ores can already be reduced to a very great extent in the lowest heat exchanger stage (reducing heat exchanger stage) of the gas suspension preheater, it is frequently already possible for the fine ores coming from the gas suspension preheater and reduced in this way to be delivered in a known manner to a corresponding further treatment without the use of a further kiln.

It should be added in this connection that it is known that the residence time of the fine ores in the gas suspension preheater can be kept relatively short (currently only seconds), even in the case of intensive heat exchange, so that relatively quick and good facilities for regulating and influencing the gas suspension preheater and thus the overall heat treatment are available, whereby the intensity or the degree of reduction of the fine ores can be influenced by the construction of the reactor loop, particularly by the length and guiding thereof.

According to an advantageous embodiment of the invention, the hot gaseous reducing agent is produced as a reducing gas in a separate reactor vessel associated with the reactor loop by sub-stoichiometric burning of gaseous, liquid and/or solid fuels and from there is introduced into the reactor loop. It is particularly advantageous if, in addition to the fuels, the required combustion air and optionally additional mixed gases are introduced into the reactor vessel. Ambient air or air preheated in a heat exchanger can be used as combustion air. Likewise, ambient air, preheated air or also low-oxygen exhaust gas (e.g. from an exhaust gas stack) can be used as mixed gas in order additionally to be able to influence the production of reducing gas.

According to a particularly advantageous embodiment of the method according to the invention, at least some of the preheated and calcined fine ores are introduced into the reactor vessel which simultaneously forms a combustion chamber and a reduction vessel, the ores being exposed in this reactor vessel to a first partial reduction by means of the reducing gas produced there and thereafter are introduced together with the reducing gas into the reactor loop for further reduction. This offers various possibilities for subjecting the preheated and calcined fine ores to an intensive reduction treatment, i.e. apart from the possibility of using the reactor vessel only as a combustion chamber for producing the hot reducing gas which is then introduced into the reactor loop into which the preheated and calcined fine ores can also be introduced together, at least a preferably adjustable fraction of the preheated and calcined fine ores can be subjected to a first partial reduction in the reactor vessel, whilst the remaining fraction of the preheated and calcined fine ores is introduced directly into the reactor loop, and moreover of course the entire fraction of preheated and calcined fine ores can also be first of all partially reduced in the reactor vessel and then largely finally reduced in the reactor loop.

In all these possibilities for reducing heat treatment, the use of the gaseous reducing agent, that is to say above all the hot reducing gas produced in the reactor vessel, has proved particularly advantageous or significant for the desired thorough reduction of the fine ores in the gas suspension preheater or in the lowest heat exchanger stage thereof with which the reactor vessel is also associated, i.e. this reactor vessel is advantageously a part of the reduction heat exchanger stage in the gas suspension preheater according to this method according to the invention.

For the case where the fine ores from the gas suspension preheater which have already been largely reduced are to be reduced even further, it is regarded as advantageous for the fine ores coming from the lowest or reducing heat exchanger stage of the gas suspension preheater (and which are therefore already very largely reduced) to be subjected to a further corrective and/or final reduction in a rotary kiln or at least one electric kiln. For this case, it may be advantageous in order to support the corrective and/or final reduction in the rotary and/or electric kiln to add to or to mix into the fine ores a fraction of fine-grained coal and/or other organic materials (in particular waste materials or the like which contain heat energy) as additional reducing agent.

Furthermore, in the preceding context in which reducing gas is produced in the rotary or electric kiln from the additional reducing agent, it may be advantageous for the hot exhaust gases containing the reducing gas from the kiln which is disposed downstream of the gas suspension preheater in the ore flow direction to be introduced into the reactor loop of the reduction heat exchanger stage and to be utilized for the reduction in the gas suspension preheater.

For the case where the reduced fine ores are to be further treated for example in a chemical decomposition process, it is advantageous for the reduced fine ores to be cooled appropriately, for example to a temperature below 120° C., in a cooling zone which is formed in particular by an indirect rotary cooler.

If according to the method according to the invention, damp starting ores are to be reduced, then according to an advantageous further embodiment of the invention, these ores can first of all be dried with the aid of hot exhaust gases from the gas suspension preheater and preferably in a pneumatic conveyor dryer.

According to a similar embodiment of the invention, it is proposed that at least partially lumpy and damp starting ores are first of all comminuted and dried before their reduction, this comminution and drying preferably being carried out in a drying and grinding apparatus with hot exhaust gases being delivered from the gas suspension preheater.

In this method according to the invention, it is regarded as advantageous overall if the reduction work is carried out in the lowest heat exchanger stage of the gas suspension preheater containing the reactor loop at a temperature of approximately 600 to 1000° C., preferably between approximately 700 and 900° C.

In this case, it may also be advantageous if reducing gas containing carbon monoxide (CO) and/or (elementary) hydrogen ($H_2$) or enriched therewith is used (e.g. by stoichiometric combustion of an injected fuel) for the reduction of the preheated and calcined fine ores in the lowest heat exchanger stage.

It should be mentioned in particular in this connection that due to the sub-stoichiometric combustion of fuel (e.g. heavy oil), the reducing gases produced in the reactor vessel contain CO and $H_2$ gases which are used for the reduction of the fine ores (e.g. of the iron oxides contained therein). For this reduction, but also in order to meet the heat requirement for the reduction and the radiation losses, more CO and $H_2$ gas fractions must be contained in the gas stream than are theoretically necessary for the reduction. These excess gas fractions are gradually burnt as they pass through the gas suspension preheater or reactor with the addition of more air, so that the most uniform temperature level possible is maintained, and preferably all combustible gas constituents should be burnt in the heat exchanger stage above the reduction heat exchanger stage.

BRIEF DESCRIPTION OF THE DRAWINGS

These and further details of the invention will be described in greater detail below in connection with an apparatus constructed according to the invention for the reduction of fine ores. Such an apparatus is illustrated by way of example in the accompanying drawings, in which.

DETAILED DESCRIPTION OF THE PREFERRED EMBODIMENT

Figure 1:
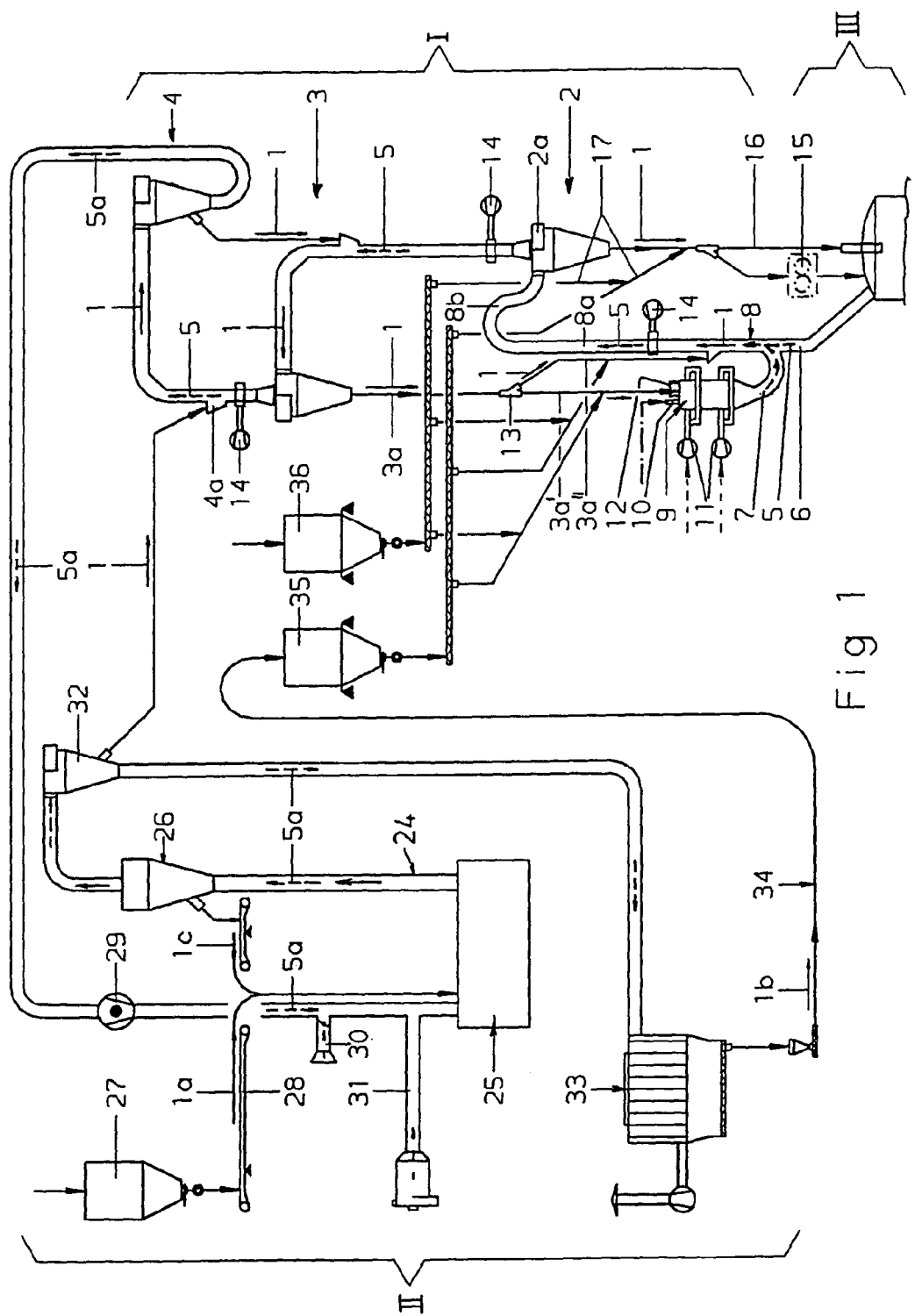
FIG. 1 shows a partially simplified flow diagram of an embodiment of a complete apparatus according to the invention.

First of all the apparatus for reduction of fine ores will be described with reference to the flow diagram according to FIG. 1. The principal part of this reduction apparatus which is essential for the actual reduction work is formed above all by a gas suspension reactor or gas suspension preheater I which is preferably constructed—as shown in FIG. 1—generally in the form of a multi-stage cyclone heat exchanger which is known per se and contains a suitable number of cyclone stages disposed one above the other as heat exchanger stages which will be described in greater detail below. This gas suspension preheater I has—when viewed in the flow direction of the ores symbolized by solid arrows 1—a drying and grinding apparatus II disposed upstream of it and an after-treatment kiln III disposed downstream of it, the latter being formed in this example by at least one electric kiln.

With regard to the general construction of the gas suspension preheater I, it may be stated that this can contain a number of cyclone stages disposed one above the other in the usual manner as appropriate for the particular application, and normally about 3 to 5 cyclone stages will suffice. According to the embodiment shown in FIG. 1, the gas suspension preheater I contains three cyclone stages disposed substantially one above the other, namely a first, lowest cyclone stage 2, a second, middle cyclone stage 3 and a third, uppermost cyclone stage 4.

As can be seen by gas conduits represented by double lines and material conduits represented by single solid lines, the cyclone stages 2, 3, 4 of this gas suspension preheater I are in communication with one another via the corresponding gas and material conduits in such a way that fine ores delivered at the top pass downwards through this gas suspension preheater I generally in counter-current flow to rising hot gases which are delivered at the bottom (broken arrows 5). In this gas suspension preheater I, the two upper cyclone stages 3, 4 serve for preheating and precalcining or calcining the fine ores (arrow 1) delivered at 4a to the uppermost cyclone stage 4.

The first, lowest cyclone stage 2 of the gas suspension preheater I is constructed as a reduction stage, and a hot gas supply in the form of a hot gas conduit 6 coming from the after-treatment kiln/electric kiln III is connected to this lowest cyclone stage 2, i.e. the hot kiln exhaust gases (broken arrows 5) from this electric kiln III are utilized at least for heating or for heat treatment and, if appropriate, partially also for reduction (in so far as reducing gas fractions or CO and $H_2$ gases are contained therein) of the fine ores in the gas suspension preheater I. Furthermore, in the region of the lower end of this lowest cyclone stage 2, there is also connected a supply or supply conduit 7 through which a reducing agent is introduced into the rising hot gases (arrow 5), as will be described in greater detail below.

In order that the principal reduction work can be done in the first, lowest cyclone stage 2, this cyclone stage 2 is constructed with a sufficiently long reactor loop 8 which—as FIG. 1 clearly shows—has a relatively long uptake conduit section 8a which rises substantially vertically in an extension of the hot gas conduit 6 and an upper section 8b which is curved approximately like a swan's neck and adjoins the section 8a and with which the reactor loop 8 opens into at least one precipitating cyclone 2a of this cyclone stage 2 which is disposed downstream. Apart from the hot gas conduit 6, the supply conduit 7 which has already been mentioned for the reducing agent is connected in the lower end region of the uptake pipe section 8a of this reactor loop 8.

As has already been mentioned above, it is regarded as an essential idea to use a gaseous reducing agent and above all a specially prepared reducing gas as reducing agent. This gaseous reducing agent or reducing gas can basically be delivered from any suitable source, so long as it can be used for sufficient reducing work. In this invention, however, it is particularly preferred if for the production of this reducing gas, a reactor vessel 9 is used which is connected via a connecting conduit to the reactor loop 8, this connecting conduit being advantageously formed in a simple manner by the supply conduit 7 already mentioned above. Also connected to this reactor vessel 9 are at least one burner 10 as fuel supply means and at least one combustion air supply 11. The combustion air supplies 11 advantageously contain corresponding fans and connecting conduits connected to the circumference of the reactor vessel 9, so that combustion air and optionally additional mixed gases can be blown thereby—preferably controllably—into this reactor vessel 9. The burner is preferably adjustably or controllably co-ordinated with the upper end of the reactor vessel 9 so that suitable gaseous, solid and/or liquid fuels can be burnt sub-stoichiometrically in the reactor vessel 9.

Furthermore, it is regarded as particularly advantageous if this reactor vessel 9 is simultaneously constructed as a combustion chamber used in the aforementioned manner and as a reduction vessel for a first reducing treatment of the preheated and calcined fine ores (arrow 1). Therefore the reactor vessel 9 has at least one feed pipe 12 for fine or at its upper end.

As can also be seen in FIG. 1, in the material conduit 3a for the preheated and calcined fine ores which leads from the second, middle cyclone stage 3 to the lowest cyclone stage (reduction heat exchanger stage) 2, there is disposed an adjustable branching or distributing device 13, from which a first branch conduit 3a' leads to the lower end region of the uptake conduit section 8a of the reactor loop 8 and a second branch conduit 3a" leads to the feed pipe 12 of the reactor vessel 9. In this way, in case of need or in adaptation to the particular desired/necessary degree of reduction, the entire preheated and calcined fine ores can be introduced either directly into the uptake conduit section 8a of the reactor loop 8 or previously into the reactor vessel 9, or adjustable fractions of the preheated and calcined fine ores can be introduced partially into the reactor loop 8 (uptake conduit section 8a) and partially into the reactor vessel 9.

The fine ores subjected in the reactor vessel 9 to a first partial reduction with the reducing gas produced therein are then introduced via the connecting or feed conduit 7 together with the still unconsumed hot reducing gases into the lower end region of the uptake conduit section 8a of the reactor loop 8, and are advantageously introduced above the connection point for the supply of the hot gases (arrows 5) and below the feed point for the direct supply of preheated and calcined fine ores into this reactor loop 8. It will be apparent that the fine ores subjected to a first reduction treatment in the reactor vessel have been particularly intensively and thoroughly reduced after passing through the reactor loop 8 and the appertaining precipitating cyclone 2a.

As has already been explained above in the explanation of the method according to the invention, care is taken to ensure that the reducing gas produced contains a sufficient proportion of CO and $H_2$ gases for the reduction work, i.e. in order to be able to achieve suitable degrees of reduction, these gases are present in an excess quantity in the rising hot gas stream at least in the lowest cyclone stage 2. They can undergo secondary combustion and can be used for the heating and temperature control. For this purpose, it may be advantageous if at least one supply connection 14 (advantageously with associated fan) for supplying further combustion air and/or pure oxygen for the secondary combustion of reducing gas is connected to the reactor loop 8 and optionally to at least one rising gas conduit to the upper cyclone stage 3, 4.

Thus this additional combustion air (and/or oxygen) can advantageously be blown in as required and adjustably into the reactor loop 8 and optionally also into at least one gas conduit of the upper cyclone stages 3, 4, so that if necessary secondary heating of the rising hot gas stream can take place in order always to be able to ensure an optimal heat treatment of the supplied fine ores in the gas suspension preheater I.

As has already been mentioned, the reduction heat exchanger stage, i.e. the lowest cyclone stage 2 of the gas suspension preheater I in the example according to FIG. 1 has an after-treatment kiln III in the form of at least one electric kiln disposed downstream of it. A corrective reduction or a final reduction or secondary reduction of the reduced fine ores leaving the gas suspension preheater I can basically be undertaken in this after-treatment kiln III if this is necessary for a predetermined further treatment of the fine ores.

Depending upon the construction or the mode of operation of the electric kiln, it may be advantageous for the reduced ores coming from the gas suspension preheater I to be introduced directly into the electric kiln or for them to be made lumpy beforehand by briquetting them in the hot state, for which purpose according to FIG. 1, a hot-briquetting press 15 as well as a suitable changeover valve or the like is indicated in the region between the gas suspension preheater I and the electric kiln.

In the case of the connection of the after-treatment kiln/electric kiln III downstream as previously described, it may also be necessary for additional coal, preferably in the form of fine coal, to be supplied to the hot reduced fine ores coming from the precipitating cyclone 2a of the lowest cyclone stage (reduction heat exchanger stage) 2. Therefore a conduit 17 for the metered supply of fine coal is also connected to the material conduit 16 leading from the precipitating cyclone 2a of the reduction heat exchanger stage/lowest cyclone stage 2 to the electric kiln/after-treatment kiln III. This fine coal to be delivered to the kiln III connected downstream is advantageously comminuted to a grain size of smaller than 3 mm, preferably smaller than 1 mm.

Figure 2:
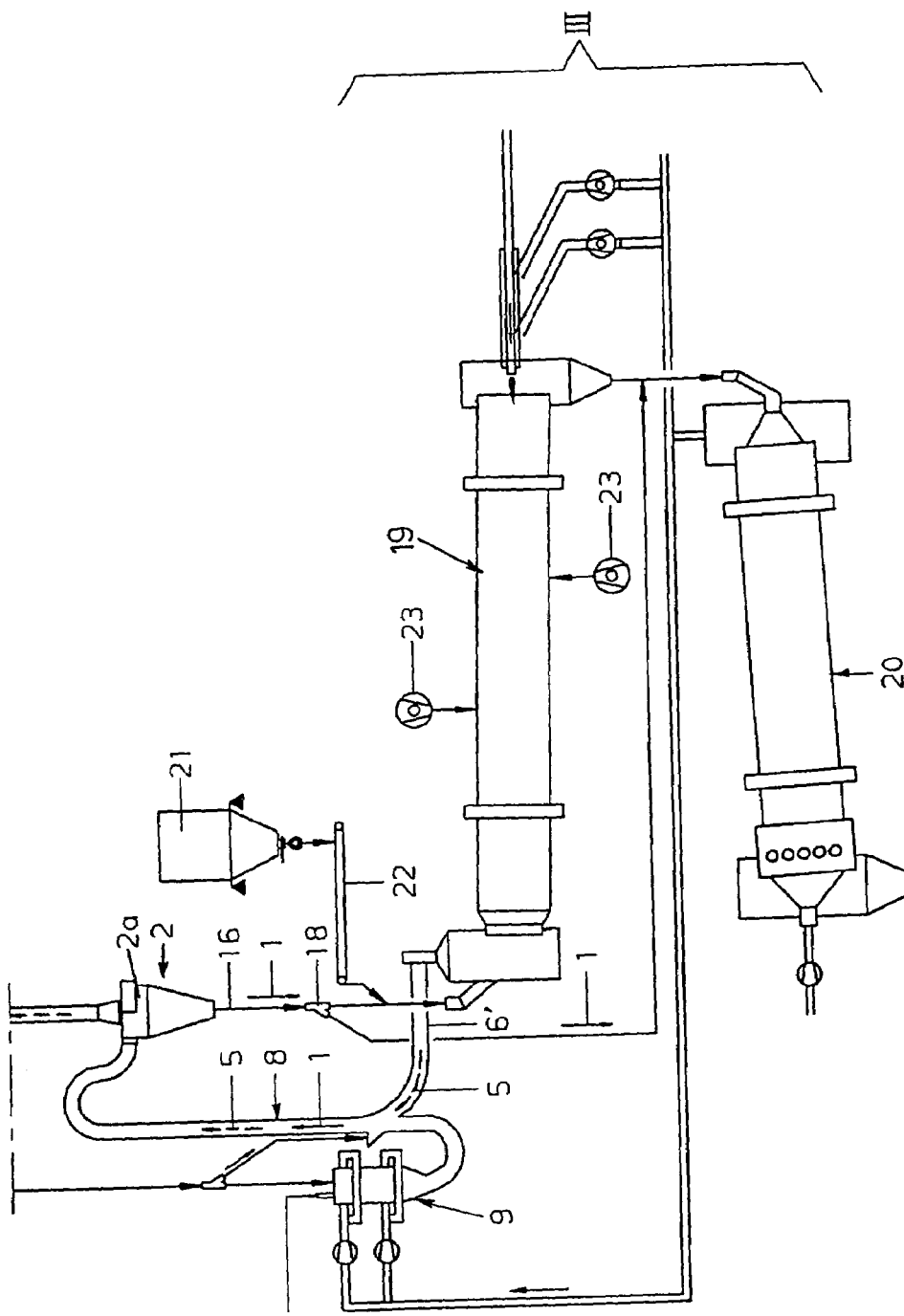
FIG. 2 shows a partial flow diagram for a variant of the apparatus, according to which a rotary kiln and a rotary cooler are disposed downstream of the gas suspension preheater.

In connection with the devices disposed downstream of the gas suspension preheater I in the ore flow direction (continuous arrows 1), reference should also be made at this point to the variant of the apparatus according to the invention which is illustrated in FIG. 2. For the sake of simplicity, of the gas suspension preheater I, this partial representation in FIG. 2 shows only the lowest cyclone stage 2 thereof constructed as a reduction heat exchanger stage with the reactor loop 8, the reactor vessel 9 and the cyclone precipitator 2a, which is connected via its downwardly leading material conduit 16 and optionally via a branching device 18 disposed in this material conduit 16 on the one hand directly to a rotary kiln 19 and on the other hand to an indirect rotary cooler 20.

In this variant (FIG. 2), the rotary kiln 19—instead of at least one electric kiln—forms the after-treatment kiln III in order to subject the reduced fine ore coming from the gas suspension preheater I or from the lowest cyclone stage 2 thereof to a corrective or final reduction if this is necessary. Also in this case, the hot exhaust gases from the rotary kiln 19 or the after-treatment kiln III can be introduced via a kiln exhaust gas conduit 6' as hot gases (broken arrows 5) into the reactor loop 8. The finally reduced fine ores discharged from this rotary kiln 19 can then if required be introduced into the indirect rotary cooler 20 and can be cooled there in a manner which is known per se to an adequate temperature, for example below approximately 120° C.

Basically in special applications, there is also a possibility of subjecting the fine ores to a first secondary reduction in the rotary kiln and to a second secondary reduction in a subsequent electric kiln.

Also in the after-treatment of the reduced fine ores coming from the lowest cyclone stage 2 of the gas suspension preheater I, it may be advantageous to measure in and to mix with them a correspondingly large fraction of fine coal before or as they enter the rotary kiln 19, for which purpose a fine coal metering container 21 with a metering conveyor 22 can be connected to the lower end of the material conduit 16. Furthermore, it may be advantageous in this connection if fans 23 for supplying additional combustion are disposed in a manner which is known per se on the rotary kiln 19, particularly on the shell thereof.

As has already been indicated above, due to the arrangement of the branching device 18 in the material conduit 16 coming from the gas suspension preheater I, a possibility also exists of bypassing the rotary kiln 19, i.e. by excluding or avoiding a corrective or final reduction and delivering the fine ores (arrow 1) thoroughly reduced in the lowest cyclone stage 2 directly to the rotary cooler 20. These reduced fine ores can then be cooled in the necessary manner—for instance for a corresponding chemical further treatment.

In the embodiment of the reduction apparatus illustrated in FIG. 1 possibilities also exist for preparing the starting ores in a suitable manner before they are supplied to the gas suspension preheater I described above, i.e. for sufficiently drying damp starting ores and comminuting starting ores in relatively large lumps in the necessary manner. For this reason, suitable devices for drying and/or comminution of damp and/or lumpy starting ores are connected upstream of the gas suspension preheater I, and these devices are supplied with the hot exhaust gases (broken arrows 5a) from the gas suspension preheater I, i.e. the exhaust gases from the gas suspension preheater I which are still hot can still be utilized for drying the starting ores and are further cooled thereby.

According to the embodiment illustrated in FIG. 1, the devices for drying and/or comminution of the starting ores can advantageously be formed by the drying and grinding apparatus II already mentioned above with the associated pneumatic conveyor dryer 24. This drying and grinding apparatus II can be constructed in a manner which is known per se and can contain as principal apparatus parts for example any suitable mill (e.g. high-speed pulveriser, tube mill with or without drying chamber and the like) 25 and at least one air classifier 26, the mill and the classifier being connected to one another by a gas conduit or the pneumatic conveyor dryer 24.

Damp and/or lumpy starting ore (arrow 1a) from a storage container 27 is delivered via a conveyor device 28 and metered to the mill 25, to which the hot exhaust gases from the heat exchanger (arrows 5a) are also delivered via a fan 29, and optionally fresh air (via a feed pipe 30) and/or hot air (via a hot air conduit 31) can also be mixed in with these hot exhaust gases from the heat exchanger (5a). The starting ores comminuted in the mill 25 and dried in the pneumatic conveyor dryer 24 are separated in the air classifier 26 into fines/fine ores and oversize material or tailings.

Whilst the tailings—according to arrow 1c—are returned to the mill 25 for further comminution, the sufficiently comminuted fine ores are led together with the exhaust gases into a precipitator 32 where the fine ores are separated from the hot exhaust gases. Whilst the separated fine ores (arrow 1) are delivered to the gas suspension preheater I, the exhaust gases (broken arrows 5a) are delivered to a suitable dust collector 33 in which the ore dust (finest ores) still contained in these exhaust gases are separated out. This precipitated ore dust (arrow 1b) can either be processed in another way or—as will generally be advantageous—can be delivered to the ores to be reduced or optionally also to the largely finally reduced ores at appropriate points, as indicated in FIG. 1 by suitable conduits and conveyor means.

For this purpose in particular, a pneumatic dust conveyor 34 can be provided, the conduit of which leads from the dust collector 33 to the gas suspension preheater I, but particularly advantageously it leads previously into an intermediate container 35 from which the ore dust is metered and delivered to the corresponding points in particular in the region of the lowest cyclone stage 2 of the gas suspension preheater I. In parallel with this, a fine coal bin 36 can also be provided if required, from which—as explained above—a corresponding fraction of fine coal can be metered (e.g. via the conduit 17) into the fine ores still to be finally reduced in the after-treatment kiln III.

The drying and grinding apparatus II can also be constructed so that the fraction of coal or fine coal necessary for the above-mentioned corrective or final reduction in the after-treatment kiln III, the rotary kiln 19 is comminuted together with the starting ores 1a in this drying and grinding apparatus II.

In the embodiment of the reduction apparatus illustrated in FIG. 1, a possibility also exists—as indicated by corresponding conduit arrows—of introducing a fraction of fine coal from the fine coal bin 36—together with ore dust and/or preheated and calcined ores—into the reactor vessel 9 if required.

The invention claimed is:

1. A method for reduction of fine ores, in which prepared fine ores pass from the top downwards through a multi-stage gas suspension preheater generally in countercurrent flow to rising hot gases and are preheated and calcined in at least one upper heat exchanger stage and then are subjected to a reducing heat treatment in at least one lower heat exchanger stage with a reducing agent being added into the delivered hot gas stream, wherein the principal part of the reducing heat treatment of the preheated and calcined fine ores is carried out in a reactor loop specially constructed in the lowest heat exchanger stage of the gas suspension preheater, said reactor loop has an uptake conduit section and a curved section adjoining the uptake conduit section and with which the reactor loop opens into at least one precipitating cyclone which is disposed downstream, and for this purpose a hot gaseous reducing agent is introduced into the rising hot gas stream.

2. A method as claimed in claim 1, wherein the hot gaseous reducing agent is produced as a reducing gas in a separate reactor vessel associated with the reactor loop by sub-stoichiometric burning of gaseous, liquid and/or solid fuels and from there is introduced into the reactor loop.

3. A method as claimed in claim 2, wherein in addition to the fuels combustion air and mixed gases are introduced into the reactor vessel (9).

4. A method as claimed in claim 2, wherein at least some of the preheated and calcined fine ores are introduced into the reactor vessel which simultaneously forms a combustion chamber and a reduction vessel, the said ores being exposed in this reactor vessel to a first partial reduction by means of the reducing gas produced there and thereafter are introduced together with the reducing gas into the reactor loop for further reduction.

5. A method as claimed in claim 1, wherein additional combustion air and/or pure oxygen is introduced at at least one point along the length of the reactor loop and of the upper heat exchanger stage for secondary combustion of the reducing gas.

6. A method as claimed in claim 1, wherein the fine ores coming from the reducing heat exchanger stage of the gas suspension preheater are subjected to a further corrective and/or final reduction in a rotary kiln or at least one electric kiln.

7. A method as claimed in claim 6, wherein the reduced fine ores coming from the lowest heat exchanger stage of the gas suspension preheater or the fine ores after-treated in the rotary kiln are introduced directly or in the hot-briquetted state into the electric kiln.

8. A method as claimed in claim 6, wherein in order to support the corrective and/or final reduction in the rotary and/or electric kiln, fine-grained coal and/or organic materials are added to the fine ores as additional reducing agent.

9. A method as claimed in claim 8, wherein the hot exhaust gases containing the reducing gas from the kiln which is disposed downstream of the gas suspension preheater in the ore flow direction are introduced as hot gases into the reactor loop.

10. A method as claimed in claim 1, wherein the reduced fine ores are cooled in a cooling zone which is formed by an indirect rotary cooler.

11. A method as claimed in claim 1, wherein for the reduction of damp starting ores these ores are dried with the aid of hot exhaust gases from the gas suspension preheater.

12. A method as claimed in claim 1, wherein at least partially lumpy and damp starting ores are first of all comminuted and dried before their reduction, this comminution and drying being carried out in a drying and grinding apparatus with hot exhaust gases being delivered from the gas suspension preheater.

13. A method as claimed in claim 8, wherein together with the starting ores, a fraction of coal for a corrective or final reduction is comminuted in a kiln disposed downstream of the gas suspension preheater.

14. A method as claimed in claim 12, wherein dust which accumulates during drying and/or comminution is precipitated out of the exhaust gas stream and delivered directly to the reactor loop of the gas suspension preheater and/or to the kiln disposed downstream thereof.

15. A method as claimed in claim 8, wherein fine coal comminuted to a grain size of smaller than 3 mm is delivered to the kiln disposed downstream.

16. A method as claimed in claim 1, wherein the reduction work is carried out in the lowest heat exchanger stage of the gas suspension preheater containing the reactor loop at a temperature of approximately 600 to 1000° C.

17. A method as claimed in claim 1, wherein reducing gas containing CO and/or $H_2$ is used for the reduction of the preheated and calcined fine ores in the lowest heat exchanger stage.

18. A method as claimed in claim 1, wherein for the reduction of damp starting ores, these ores are dried with the aid of hot exhaust gases from the gas suspension preheater in a pneumatic conveyor dryer.

19. A method as claimed in claim 8, wherein fine coal comminuted to a grain size of smaller than 1 mm is delivered to the kiln disposed downstream.

20. A method as claimed in claim 1, wherein the reduction work is carried out in the lowest heat exchanger stage of the gas suspension preheater containing the reactor loop at a temperature between approximately 700 and 900° C.

* * * * *